(12) United States Patent
Bialer et al.

(10) Patent No.: US 11,860,297 B2
(45) Date of Patent: Jan. 2, 2024

(54) HIGH RESOLUTION UNAMBIGUOUS RADAR

(71) Applicant: GM GLOBAL TECHNOLOGY OPERATIONS LLC, Detroit, MI (US)

(72) Inventors: Oded Bialer, Petah Tivak (IL); Amnon Jonas, Herzliya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 390 days.

(21) Appl. No.: 17/194,604

(22) Filed: Mar. 8, 2021

(65) Prior Publication Data

US 2022/0283265 A1 Sep. 8, 2022

(51) Int. Cl.
*G01S 7/03* (2006.01)
*G01S 13/42* (2006.01)
*G01S 13/931* (2020.01)

(52) U.S. Cl.
CPC ............ *G01S 7/032* (2013.01); *G01S 13/426* (2013.01); *G01S 13/931* (2013.01); *G01S 2013/93271* (2020.01); *G01S 2013/93272* (2020.01)

(58) Field of Classification Search
CPC .................. G01S 7/032; G01S 13/426; G01S 2013/93271; G01S 2013/93272; G01S 13/931; H01Q 21/00; H01Q 21/06; H01Q 21/08; H01G 21/061
See application file for complete search history.

(56) References Cited

U.S. PATENT DOCUMENTS

| | | | |
|---|---|---|---|
| 10,965,038 B2 * | 3/2021 | Kishigami | G01S 13/42 |
| 11,448,725 B2 * | 9/2022 | Iwasa | G01S 13/42 |
| 11,520,030 B2 * | 12/2022 | Wu | G01S 13/325 |
| 2015/0253419 A1 * | 9/2015 | Alland | G01S 13/42 342/385 |
| 2016/0033632 A1 * | 2/2016 | Searcy | G01S 13/424 342/153 |
| 2016/0285172 A1 * | 9/2016 | Kishigami | G01S 7/023 |
| 2018/0074181 A1 * | 3/2018 | Kishigami | G01S 13/282 |
| 2018/0088221 A1 * | 3/2018 | Yomo | G01S 7/003 |
| 2018/0088224 A1 * | 3/2018 | Kishigami | H01Q 21/06 |
| 2018/0166794 A1 * | 6/2018 | Raphaeli | G01S 13/06 |
| 2019/0235066 A1 * | 8/2019 | Iida | G01S 13/003 |
| 2019/0250249 A1 * | 8/2019 | Raphaeli | G01S 13/582 |
| 2019/0310358 A1 * | 10/2019 | Lee | G01S 13/42 |
| 2019/0310359 A1 * | 10/2019 | Lee | G01S 13/86 |
| 2019/0377059 A1 * | 12/2019 | Kondo | G08G 1/166 |
| 2020/0103495 A1 * | 4/2020 | Iwasa | G01S 7/4008 |
| 2020/0103515 A1 * | 4/2020 | Kishigami | G01S 7/4026 |
| 2020/0292661 A1 * | 9/2020 | Lee | H01Q 1/3233 |
| 2020/0300965 A1 * | 9/2020 | Wu | G01S 7/2883 |
| 2021/0349201 A1 * | 11/2021 | Trummer | G01S 7/4021 |
| 2022/0066012 A1 * | 3/2022 | Jansen | G01S 7/0235 |
| 2022/0236407 A1 * | 7/2022 | Lim | H01Q 1/24 |

* cited by examiner

Primary Examiner — Peter M Bythrow
(74) Attorney, Agent, or Firm — CANTOR COLBURN LLP (57) ABSTRACT

A radar system and method include and employ a plurality of substantially identical transceiver sets establishing respective substantially identical, overlapping virtual antenna arrays. A first sub-array of widely spaced virtual antennas provides high angular resolution but high angular ambiguity. A second sub-array of narrowly spaced virtual antennas provides low angular ambiguity but low angular resolution.

20 Claims, 4 Drawing Sheets

HIGH RESOLUTION UNAMBIGUOUS RADAR

INTRODUCTION

The subject disclosure relates to radar systems.

Vehicles (e.g., automobiles, trucks, aircraft, construction equipment, farm equipment, factory equipment, whether user or autonomously operated) may be equipped with detection systems for monitoring surrounding environments. An example detection system may include radar devices that are used for detecting objects/obstacles, tracking objects, and avoiding obstacles. Radar devices may also be used in vehicles to alert a user (e.g., driver or passenger) and in advanced driver-assistance systems (ADAS).

Radar devices are generally useful in target detection and may commonly provide information indicating range/rate, azimuth and elevation of targets. Automotive radar devices, for example as used in forward looking target detection, are generally more concerned with azimuthal angular resolution and less concerned with elevational angular resolution. High resolution radar devices typically require large numbers of antennas with signal processing done on a radio frequency (RF) semiconductor chip (chip). The signal processing from such large numbers of antennas may not be practical on a single RF chip due to lengthy connecting traces between the antennas and the RF chip. Thus, multiple RF chips may be coupled to respective sub-sets of antennas. Antenna placement is critical to the ability of the radar system to estimate the angle of reflected radar signal arrival with high angular resolution and without angular ambiguity. Such antenna sub-sets may allow for flexibility of antenna placement with many degrees of freedom since the antennas are external to the RF chip and it is a relatively simple matter to provide for different individual antenna placements within each antenna sub-set and different placements of the various antenna sub-sets. Such radar systems may typically operate in millimeter range wavelength or about 7.5 millimeters (40 GHz) to about 1 millimeter (300 GHz). Automotive millimeter radar may operate from about 75 GHz to about 110 GHz and more particularly from about 77 GHz to about 81 GHz.

Improvements in angular resolution of radar devices are possible at higher operating frequency. It is known that higher angular resolution is proportional to operating frequency. Higher operating frequency may limit the ability to have antennas external from the RF chip. Radar devices operating at higher frequencies, for example at about 240 GHz, benefit from integrating antennas as part of the RF chip because at such high frequencies radar devices are very sensitive to the accurate position of antennas, gain loss is reduced with shorter connecting traces, crosstalk is reduced, and such integrations are robust to variations in temperature. However, each unique sub-set of antenna placements would require a unique RF chip manufacture thus negatively impacting cost and complexity. Thus, it becomes desirable to minimize the number of unique RF chips which undesirably constrains the degrees of freedom in antenna placements and negatively affects angular resolution and angular unambiguity.

Therefore, it is desirable to improve angular resolution and ambiguity performance of RF chip antenna integrated radar devices while also minimizing the number of unique RF chips required to do so.

SUMMARY

In one exemplary embodiment, a radar system includes a plurality of substantially identical transceiver sets. Each transceiver set may have at least one respective transmit chip and at least one respective receive chip. Each transmit chip may include a respective transmit front end, respective connecting traces, and a respective transmit sub-array of N substantially uniformly spaced transmit antennas where N is an integer. Each receive chip may include a respective receive front end, respective connecting traces, and a respective receive sub-array of M substantially uniformly spaced receive antennas where M is an integer. Each transceiver set may be spaced from adjacent transceiver sets by a substantially identical distance D4. Each transceiver set establishes a respective virtual antenna array, and the respective virtual antenna arrays established by adjacent transceiver sets may at least partially overlap in an overlap region.

In addition to one or more of the features described herein, the respective virtual antenna arrays may include respective virtual antennas, and the virtual antennas that are within the overlap region are in spaced adjacency.

In addition to one or more of the features described herein, the substantially uniformly spaced receive antennas may be spaced a distance D2, and the distance D2 may be at least one wavelength of a radar signal.

In addition to one or more of the features described herein, the distance D2 may be an integer multiple of one wavelength of the radar signal.

In addition to one or more of the features described herein, the substantially uniformly spaced receive antennas may be spaced a distance D2, and the substantially uniformly spaced transmit antennas may be spaced a distance D1=M*D2.

In addition to one or more of the features described herein, the distance D4 may be less than N*D1.

In addition to one or more of the features described herein, the at least one respective transmit chip and the at least one respective receive chip of each substantially identical transceiver set may include separate dies packaged into separate chips.

In addition to one or more of the features described herein, the at least one respective transmit chip and the at least one respective receive chip of each substantially identical transceiver set may include separate dies packaged into a single chip.

In addition to one or more of the features described herein, the at least one respective transmit chip and the at least one respective receive chip of each substantially identical transceiver set may include a common die.

In addition to one or more of the features described herein, the plurality of substantially identical transceiver sets may include a common die.

In another exemplary embodiment, a radar method may include establishing, with a first transceiver set, a first virtual antenna array having a first plurality of virtual antennas substantially uniformly spaced by a distance D2. The method further may include establishing, with a second transceiver set substantially identical to the first transceiver set, a second virtual antenna array having a second plurality of virtual antennas substantially uniformly spaced by the distance D2. The method may further include overlapping the first virtual antenna array and the second antenna array such that a portion of the first plurality of virtual antennas and a portion of the second plurality of virtual antennas alternate in spaced adjacency.

In addition to one or more of the features described herein, the radar method may further include performing a first beam forming operation upon a first virtual sub-array having ones of the first plurality of virtual antennas and ones of the second plurality of virtual antennas that are spaced by at least the distance D2 to evaluate a radar signal at a first angular resolution. The method may further include performing a second beam forming operation upon a second virtual sub-array having ones of the first plurality of virtual antennas and ones of the second plurality of virtual antennas that are spaced by less than the distance D2 to evaluate the radar signal at a second angular resolution less than the first angular resolution.

In addition to one or more of the features described herein, the radar method may further include determining an angle of arrival of the radar signal based upon the evaluated radar signal at the first angular resolution and at the evaluated radar signal at the second angular resolution.

In addition to one or more of the features described herein, the distance D2 may be at least one wavelength of a radar signal.

In addition to one or more of the features described herein, the distance D2 may be an integer multiple of one wavelength of the radar signal.

In yet another exemplary embodiment, a radar system may include a first transceiver set having a respective transmit chip and a respective receive chip, and a second transceiver set having a respective transmit chip and a respective receive chip. The respective transmit chip and the respective receive chip of each of the first transceiver set and the second transceiver set may have a substantially identical spatial layout. Each transmit chip may include a respective transmit front end, respective connecting traces, and a respective transmit sub-array of N substantially uniformly spaced transmit antennas where N is an integer, wherein each respective transmit sub-array may have a substantially identical spatial layout of the N substantially uniformly spaced transmit antennas. Each receive chip may include a respective receive front end, respective connecting traces, and a respective receive sub-array of M substantially uniformly spaced receive antennas where M is an integer, wherein each respective receive sub-array may have a substantially identical spatial layout of the M substantially uniformly spaced receive antennas. The first transceiver set may establish a first virtual antenna array and the second transceiver set may establish a second virtual antenna array. The respective virtual antenna arrays established by adjacent transceiver sets may at least partially overlap in an overlap region.

In addition to one or more of the features described herein, the substantially uniformly spaced receive antennas may be spaced a distance D2, and the distance D2 may be at least one wavelength of a radar signal.

In addition to one or more of the features described herein, the distance D2 may be an integer multiple of one wavelength of the radar signal.

In addition to one or more of the features described herein, the substantially uniformly spaced receive antennas may be spaced a distance D2, and the substantially uniformly spaced transmit antennas may be spaced a distance D1=M*D2.

In addition to one or more of the features described herein, the first transceiver set and the second transceiver set may be spaced by a distance D4 less than N*D1.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. Throughout the drawings, corresponding reference numerals indicate like or corresponding parts and features.

In accordance with one or more exemplary embodiments, methods and systems for high angular resolution and unambiguous angle estimation in a radar device are described herein. Exemplary embodiments may include minimal numbers of different RF chip antenna integrated radar devices. For example, at least two of a single type of RF chip antenna integrated packaging may be arranged to establish a virtual antenna array capable of high angular resolution and unambiguous angle estimation.

Figure 1:
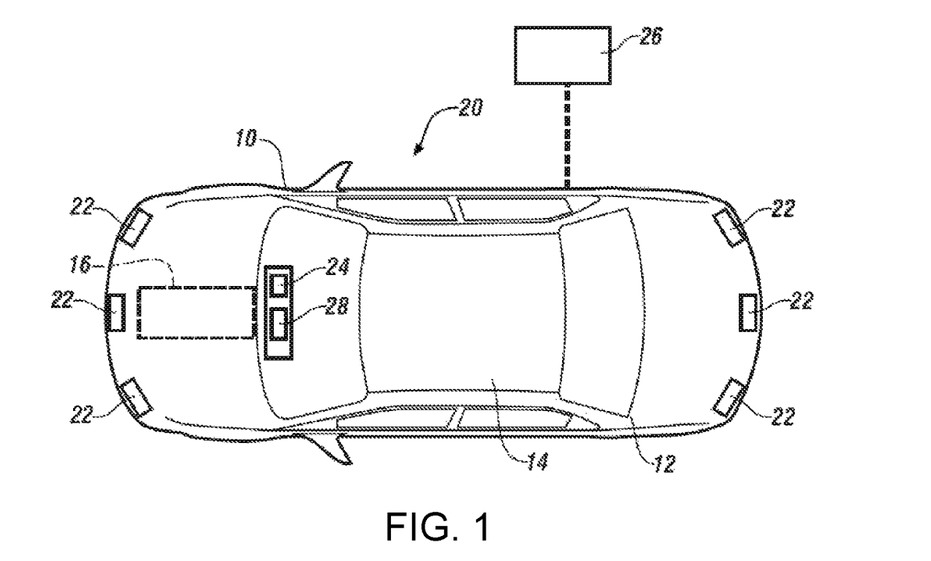
FIG. 1 shows an embodiment of a vehicle, in accordance with the present disclosure.

FIG. 1 shows an embodiment of a vehicle 10, which includes a vehicle body 12 defining, at least in part, an occupant compartment 14. The vehicle 10, while shown in FIG. 1 as an automobile, may be any truck, aircraft, construction equipment, farm equipment, factory equipment, etc. whether user or autonomously operated. Thus, the vehicle and the vehicle body 12 are not limiting.

The vehicle body 12 may support various vehicle subsystems including a powertrain 16 including an electric drive unit or internal combustion engine, and other subsystems to support functions of the powertrain 16 and other vehicle components, such as a braking subsystem, a steering subsystem, a fuel injection subsystem, an exhaust subsystem and others.

The vehicle 10 may include a detection system 20 for detecting objects/obstacles, tracking objects, and avoiding obstacles, which may be used to alert a user, perform avoidance maneuvers, assist with user control, and/or assist with autonomously controlling the vehicle 10. The detection system 20 may include one or more radar devices 22. The vehicle 10 may incorporate a plurality of radar devices 22 disposed at various locations of the vehicle body 12 and having various angular directions, as shown in FIG. 1.

An embodiment of the detection system 20 is configured to estimate angular position of an object. An object may be any feature or condition that reflects transmitted radar signals, such as other vehicles, people, road signs, trees, road features, road obstructions, and others.

Each radar device 22 may include transmit and receive functions which may be carried out by separate transmit and receive antenna arrays in a Multiple-Input Multiple-Output (MIMO) arrangement. Each radar device 22 may include components and features, such as transmit and receive antenna arrays, corresponding transmit and receive radar front end, and feedlines coupling the antennas to the radar front end. Radar front end is understood to include RF radar functions and other functions carried out primarily in the analog domain including transmit channel signal generation and transmission and receive channel conditioning. RF radar functions may include digitization of analog signals (e.g., analog-to digital (A/D) and digital-to-analog (D/A) conversions). Each radar device may further include radar backend which is understood to include digital domain radar functions including digital signal processing (DSP) of digitized reflected radar signals. Radar backend functions may include digitization of analog signals (e.g., analog-to digital (A/D) and digital-to-analog (D/A) conversions). Further, each radar device 22 via a controller (e.g., microcontroller unit) or other processing device (e.g., combinational logic circuit) may execute one or more software or firmware programs that provide desired functionality. Radar backend processes and functions may be carried out within the radar device 22 or external thereto, for example via a controller or other processing device.

The radar devices 22 may communicate with one or more processing devices, such as co-packaged processing devices in each radar device 22, an on-board processor 24, or a remote processor 26. The remote processor 26 may be part of, for example, a mapping system or vehicle diagnostic system. The vehicle 10 may also include a user interaction system 28 and other components such as a global positioning system (GPS) device.

Figure 2:
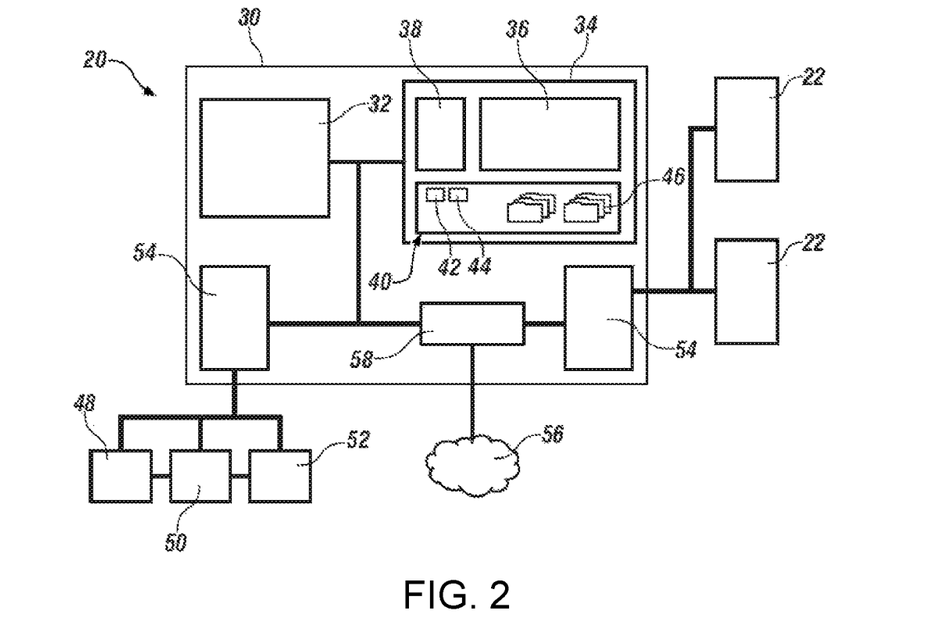
FIG. 2 illustrates an embodiment of a computer system, in accordance with the present disclosure.

FIG. 2 illustrates an embodiment of a computer system 30 that is in communication with or is part of the detection system 20, and that may perform various aspects of embodiments described herein. The computer system 30 includes at least one processing device 32, which generally includes one or more processors for performing functions of radar detection and analysis described herein. The processing device 32 may be integrated into the vehicle 10, for example, as the on-board processor 24, or may be a processing device separate from the vehicle 10, such as a server, a personal computer or a mobile device (e.g., a smartphone or tablet). The processing device 32 may also be co-packaged within the radar device 22 or incorporated into a system-on-chip radar device 22 which may also include the antenna arrays, radar front end, and feedlines. The processing device 32 may be configured to perform radar detection and analysis methods and radar backend processes such as DSP including digital beam forming described herein, among other functions.

Components of the computer system 30 include the processing device 32 (such as one or more processors, processing units or digital signal processors) and a system memory 34. The system memory 34 may include a variety of computer system readable media. Such media may be any available media that is accessible by the processing device 32, and includes both volatile and non-volatile media, removable and non-removable media.

For example, the system memory 34 may include a non-volatile memory 36 and may also include a volatile memory 38. The computer system 30 may further include other removable/non-removable, volatile/non-volatile computer system/readable storage media. A computer system/readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The system memory 34 may include at least one program product having a set (e.g., at least one) of program modules that are configured to carry out functions of the embodiments described herein. For example, the system memory 34 stores various program modules 40 that generally carry out the functions and/or methodologies of embodiments described herein. For example, a receiver module 42 may be included to perform functions related to acquiring and processing received signals, and an analysis module 44 may be included to perform functions related to position estimation and range finding. The system memory 34 may also store various data structures 46, such as data files or other structures that store data related to radar detection and analysis. Examples of such data include sampled return radar signals, radar impulse response, the array beam pattern, frequency data, range-Doppler plots, range maps, and object position, velocity and/or azimuth data. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 32 may also communicate with one or more external devices 48 such as a keyboard, a pointing device, and/or any devices (e.g., network card, modem, etc.) that enable the processing device 32 to communicate with one or more other computing devices. In addition, the processing device 32 may communicate with one or more devices that may be used in conjunction with the detection system 20, such as a GPS device 50 and a camera 52. The GPS device 50 and the camera 52 may be used, for example, in combination with the detection system 20 for autonomous control of the vehicle 10. Communication with various devices may occur via Input/Output (I/O) interfaces 54.

The processing device 32 may also communicate with one or more networks 56 such as a local area network (LAN), a general wide area network (WAN), and/or a public network (e.g., the Internet) via a network adapter 58. It should be understood that although not shown, other hardware and/or software components could be used in conjunction with the computer system 30. Examples include, but are not limited to: microcode, device drivers, redundant processing units, external disk drive arrays, RAID systems, and data archival storage systems, etc.

In accordance with the present disclosure, a radar device includes substantially identical transceiver sets of MIMO transmit (TX) chips and receive (RX) chips. A radar device includes a plurality of such substantially identical transceiver sets. Within each transceiver set, the number of TX chips may be greater than the number of RX chips, the number of TX chips may be less than the number of RX chips, or the number of TX chips may equal the number of RX chips. All transceiver sets have the same number of TX chips. All transceiver sets have the same number of RX chips. All transceiver sets have the same spatial layout among the TX chips and RX chips. As used herein, chip may refer generally to a semiconductor die including electric circuit elements including antennas, components, conductors, films, etc. formed on electronic-grade silicon (EGS) or other semiconductor (such as GaAs). Chip may also refer to one or more packaged dies (including pinout connections) for printed circuit board (PCB) mounting. A TX chip may at least include a respective TX sub-array of antennas, connecting traces and radar front end structures and functions for transmit channels. Similarly, a RX chip may at least include a respective RX sub-array of antennas, connecting traces and radar front end structure and functions for receive channels. All TX sub-arrays have equivalent numbers of TX antennas and substantially identical spatial layouts of the TX antennas. Similarly, all RX sub-arrays have equivalent numbers of RX antennas and substantially identical spatial layouts of the RX antennas. For purposes of this disclosure, arrays and sub-arrays refer to linear arrays and sub-arrays. TX and RX chips may additionally include radar backend structures and functions including DSP and MCU(s).

Figure 3:
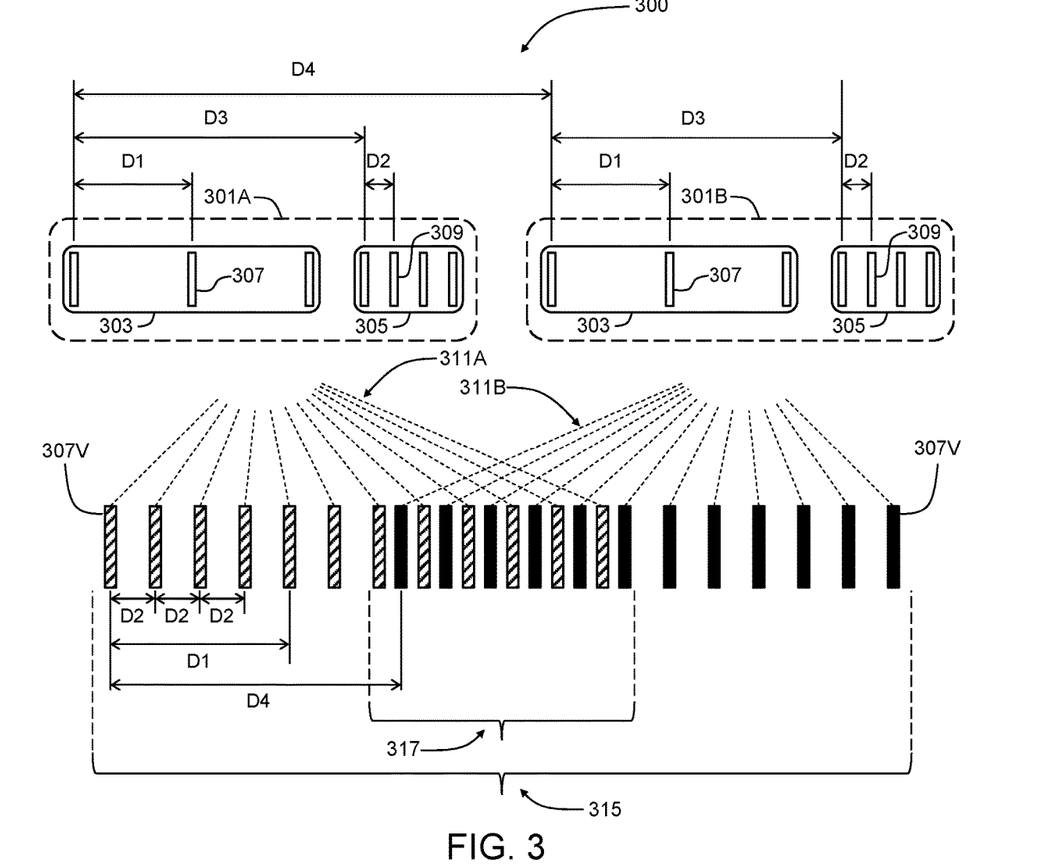
FIG. 3 illustrates an embodiment of a radar device and virtual antenna arrays, in accordance with the present disclosure.

In one embodiment and with reference to FIG. 3, a radar device 300 includes a pair of transceiver sets 301A and 301B of TX and RX chips 303 and 305. A first transceiver set of TX and RX chips 301A and a second transceiver set of TX and RX chips 301B are substantially identical. In the present embodiment, each transceiver set includes one TX chip 303 and one RX chip 305. The TX chips 303 include a TX radar front end and feedlines (not detailed) and a TX sub-array of antennas 307. The TX sub-array of antennas 307 includes a plurality (N) of such antennas 307. The RX chips 305 include a RX radar front end and feedlines (not detailed) and a RX sub-array of antennas 309. The RX sub-array of antennas 309 includes a plurality (M) of such antennas 309. In the present example N=3 and M=4. In one embodiment, the TX and RX chips (e.g., 303 and 305) may be fabricated as separate dies and individually packaged into separate chips (including pinouts) and then co-packaged into an integrated radar device, such as by mounting on a common PCB in accordance with the desired spatial layout among the TX and RX chips (e.g., 303 and 305) and transceiver sets (e.g., 301A and 301B). In another embodiment, the TX and RX chips (e.g., 303 and 305) may be fabricated as separate dies but packaged into a single transceiver chip (including pinouts) in accordance with the desired spatial layout between the TX and RX chips (e.g., 303 and 305) and mounted on a PCB in accordance with the desired spatial layout between the transceiver sets (e.g., 301A and 301B). In another embodiment, the TX and RX chips (e.g., 303 and 305) may be fabricated on a common die in accordance with the desired spatial layout between the TX and RX chips (e.g., 303 and 305) and included in a single transceiver chip (i.e., a transceiver set)(including pinouts) and mounted on a PCB in accordance with the desired spatial layout between the transceiver sets (301A and 301B). In another embodiment, the TX and RX chips (e.g., 303 and 305) of multiple transceiver sets (e.g., 301A and 301B) may be fabricated on a common die in accordance with the desired spatial layout among the TX and RX chips (e.g., 303 and 305) and the transceiver sets (e.g., 301A and 301B) and included in a single integrated chip (including pinouts) including all TX chips and RX chips defining all transceiver sets and mounted on a PCB. Other packaging embodiments are possible and may be apparent to one having ordinary skill in the art. Thus, it is envisioned that the TX and RX chips may be discrete components that are co-packaged into an integrated radar device, may be fabricated as part of a complete or partial system-on-chip radar device, or may be incorporated at various other levels of integration as may be required for differing end use applications.

As described, the first transceiver set of TX and RX chips 301A and the second transceiver set of TX and RX chips 301B are substantially identical. Thus, all TX chips 303 have substantially identical spatial layouts and all RX chips 305 have substantially identical spatial layouts. In the embodiment illustrated in FIG. 3, the TX sub-array antennas 307 are spaced by a distance D1 (TX antenna spacing). The RX sub-array antennas 309 are spaced by a distance D2 (RX antenna spacing). The TX chip 303 and the RX chip 305 are separated by a TX chip to RX chip distance D3. The first transceiver set of TX and RX chips 301A and the second transceiver set of TX and RX chips 301B are offset or spaced by a distance D4 (transceiver set spacing). The RX antenna spacing distance D2 may be established to a value greater than K*$\lambda$, where $\lambda$ is the radar operating wavelength. Radar operating wavelength may include one or both of a transmit wavelength and a receive wavelength. In one embodiment, K is at least 1. In another embodiment, K is an integer. In another embodiment, K is an integer greater than 1. Antenna spacing at or above the RX antenna spacing distance D2 are for the purposes of this disclosure referred to as widely spaced, whereas antenna spacing below the RX antenna spacing distance D2 are for the purposes of this disclosure referred to as narrowly spaced. The TX antenna spacing distance D1 may be established equal to M*D2 where M is the number of RX sub-array antennas 309 on each RX chip 305. The transceiver set spacing distance D4 may be established to less than N*D1 where N is the number of TX sub-array antennas 307 on each TX chip 303. The TX chip to RX chip distance D3 may be established arbitrarily though is substantially identical between the first transceiver set of TX and RX chips 301A and the second transceiver set of TX and RX chips 301B. By establishing the TX antenna spacing distance D1 and the RX antenna spacing distance D2 as described, each transceiver set of TX and RX chips establishes a respective N*M virtual array of antennas substantially uniformly spaced by the RX antenna spacing distance D2. By establishing the transceiver set spacing distance D4 as described, each respective virtual array is offset from the other and overlaps the other by some amount, whereby antennas from the respective virtual arrays alternate within the overlapped region. Thus, while the virtual arrays overlap, the individual array antennas do not overlap but are in spaced adjacency. Preferably, the separation between the adjacent, alternating antennas is substantially uniform and substantially one-half the RX antenna spacing distance D2. In combination, the respective virtual arrays established by the first transceiver set of TX and RX chips 301A and the second transceiver set of TX and RX chips 301B together establish a combined virtual array that spans a wider aperture than the individual respective virtual arrays from each of the transceiver sets of TX and RX chips thus providing higher angular resolution. Significantly, by establishing the transceiver set spacing distance D4 less than N*D1 such that the overlapped antennas alternate with tighter spacing than the RX antenna spacing distance D2 the overlapped region may provide less angular ambiguity.

As illustrated in FIG. 3, the first transceiver set of TX and RX chips 301A establishes a respective first N*M virtual array of antennas 311A (cross-hatch filled virtual antennas 307V) substantially uniformly spaced by the RX antenna spacing distance D2. In the present exemplary embodiment where N=3 and M=4 the virtual array 311A has 12 virtual antennas 307V. Similarly, the second transceiver set of TX and RX chips 301B establishes a respective second N*M virtual array of antennas 311B (solid filled virtual antennas 307V) substantially uniformly spaced by the RX antenna spacing distance D2. In the present exemplary embodiment where N=3 and M=4 the virtual array 311B has 12 virtual antennas 307V. The combined virtual array 315 includes both the first virtual array 311A and the second virtual array 311B and extends to extreme outer ends of the respective first and second virtual arrays 311A and 311B. The first virtual array 311A and the second virtual array 311B overlap in overlap region 317 where the virtual antennas from the respective virtual arrays alternate.

Figure 4:
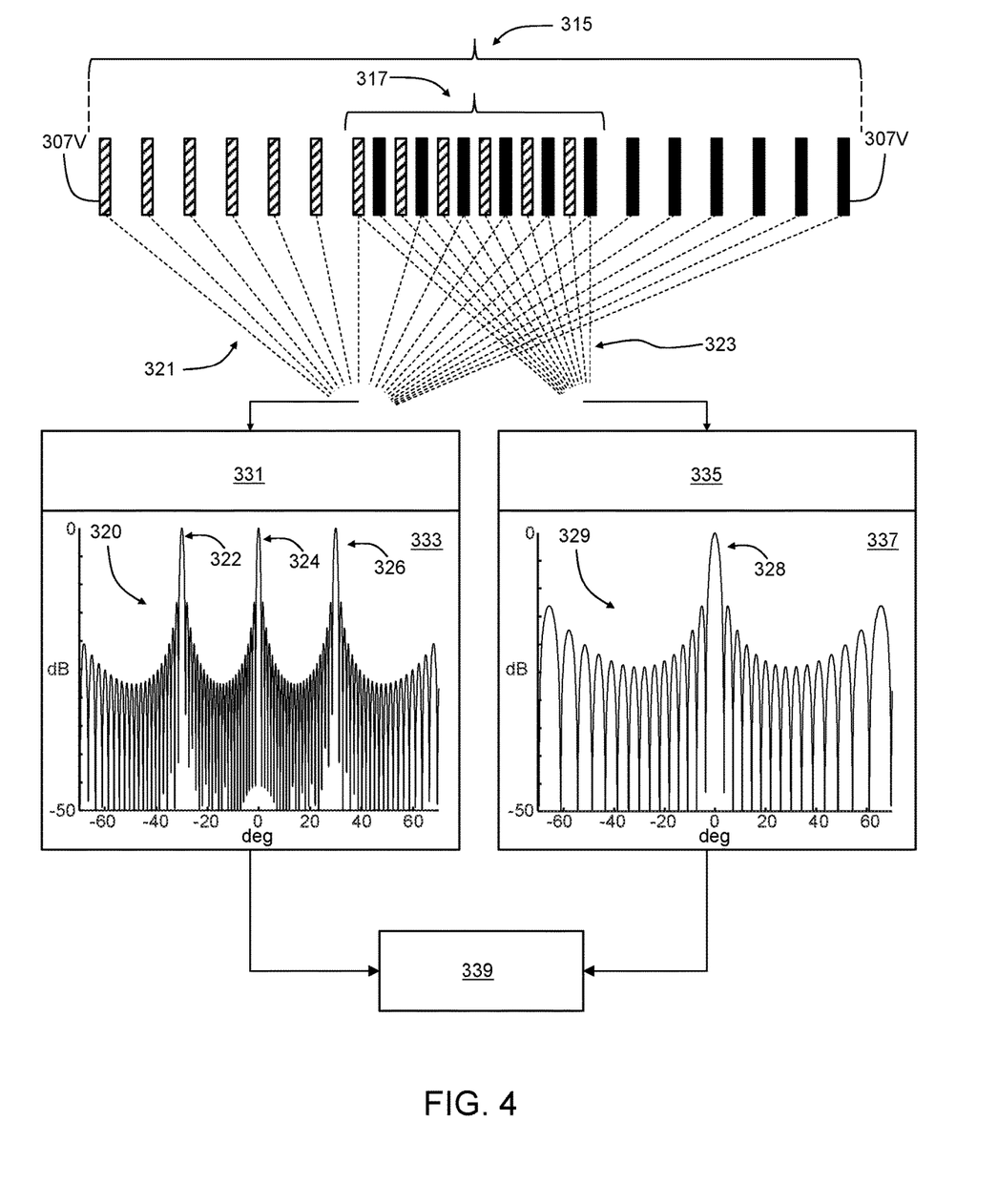
FIG. 4 illustrates virtual antenna arrays and an operational process flow to evaluate reflected radar signals with high angular resolution and low angular ambiguity.

FIG. 4 illustrates the combined virtual array 315 and its use in an operational process flow to evaluate reflected radar signals with high angular resolution and low angular ambiguity. The combined virtual array 315 is a universal set of all virtual antennas from all the transceiver sets of TX and RX chips used in a radar device configured in accordance with the present disclosure. In the present embodiment utilizing two such transceiver sets of TX and RX chips, the combined virtual array includes all virtual antennas (cross-hatch filled virtual antennas 307V) established by the first transceiver set of TX and RX chips 301A and all virtual antennas (solid filled virtual antennas 307V) established by the second transceiver set of TX and RX chips 301B. A first virtual sub-array 321 includes virtual antennas 307V extending to the extreme outer regions of the combined virtual array 315 and at least a portion of the virtual antennas 307V in the overlap region 317. The adjacent virtual antennas 307V outside the overlap region 317 are widely spaced (i.e., equal to the RX antenna spacing distance D2) whereas the adjacent virtual antennas within the overlap region 317 are narrowly spaced (i.e., less than the RX antenna spacing distance D2). The virtual antennas 307V within the overlap region 317 that are included with the first virtual sub-array 321 are also preferably widely spaced (i.e., greater than or equal to the RX antenna spacing distance D2). Therefore, the virtual antennas 307V within the overlap region 317 that are included with the first virtual sub-array 321 are not adjacent ones of the virtual antennas. Thus, the virtual antennas 307V that make up the first virtual sub-array 321 provide a wide aperture with widely spaced virtual antennas 307V characterized by high angular resolution but high angular ambiguity. A second virtual sub-array 323 only includes the virtual antennas 307V in the overlap region 317. The adjacent virtual antennas within the overlap region 317 are narrowly spaced (i.e., less than the RX antenna spacing distance D2). Thus, the virtual antennas 307V that make up the second sub-array 321 provide a narrow aperture of narrowly spaced virtual antennas 307V characterized by low angular ambiguity but low angular resolution. As used herein, high and low angular resolutions are relative terms referring to the angular resolution of one virtual sub-array compared to the angular resolution of the other virtual sub-array. Likewise, as used herein, high and low angular ambiguity are relative terms referring to the angular ambiguity of one virtual sub-array compared to the angular ambiguity of the other virtual sub-array.

In one embodiment, radar backend processing may selectively partition the combined virtual array 315 into the first virtual sub-array 321 and the second virtual sub-array 323 as described. A first beam forming operation may be performed using the first sub-array 321 to evaluate the angle of arrival of reflected radar signals at 331. Generally, the beam forming operation receives reflected radar signals from each of the virtual antennas of the first sub-array 321 and coherently combines them for each angle of arrival. An exemplary two-dimensional plot of a reflected radar signal corresponding to a single centrally located (0 degree azimuth angle) target from the first beam forming operation upon the first sub-array 321 is shown at 333. The resulting beam forming spectrum 320 from the first sub-array 321 is represented graphically as a plot of combined intensity amplitude (relative power) along a vertical axis [dB] vs. azimuth angle (angle of arrival) along a horizontal axis [deg]. In the example target detection plot, the main lobe 324 is of high angular resolution as is characteristic of the widely spaced virtual antennas and corresponds to a true target angle at 0 degrees. Grating lobes 322 and 326, also characteristic of widely spaced virtual antennas, also appear at substantially similar amplitudes as the main lobe 324 but are not readily distinguishable over the true target main lobe thereby introducing ambiguity into the estimation of the true angle of arrival of the reflected radar signal and target location. A second beam forming operation may be performed using the second virtual sub-array 323 to evaluate the angle of arrival of reflected radar signals at 335. Generally, the beam forming operation receives reflected radar signals from each of the virtual antennas of the second virtual sub-array 323 and coherently combines them for each angle of arrival. An exemplary two-dimensional plot of a reflected radar signal corresponding to a single centrally located (0 degree azimuth angle) target from the second beam forming operation upon the second virtual sub-array 323 is shown at 337. The resulting beam forming spectrum 329 from the second virtual sub-array 323 is represented graphically as a plot of combined intensity amplitude (relative power) along a vertical axis [dB] vs. azimuth angle (angle of arrival) along a horizontal axis [deg]. In the example target detection plot the main lobe 328 corresponds to a true target angle at 0 degrees. The main lobe 328 is of low angular resolution as is characteristic of the narrowly spaced virtual antennas but is not ambiguous as validated by the absence of any angularly proximate grating lobes of comparable amplitude. The beam forming operations applied to the reflected radar signals from each of the first sub-array 321 and the second virtual sub-array 323 may be any suitable variety. One exemplary method of beam forming includes Bartlett beam forming. Other beam forming methods may be employed including, by way of non-limiting examples, MVDR (Capon), MUSIC, SAMV, Linear Prediction and Machine Learning (e.g., DNN estimation). At 339, lobe matches between the beam forming spectrum 320 and the beam forming spectrum 329 determine the true angle of arrival or target angle. This may be accomplished, for example, through comparisons and angular matches of spectral peaks from the beam forming spectrums 320 and 329, or through filtering of the high angular resolution beam forming spectrum 320 in view of the low angular resolution beam forming spectrum 329. The true angle of arrival or target angle corresponds to the main lobe 324 of the high angular resolution beam forming spectrum 320 that matches the angle of the main lobe 328 of the low angular resolution beam forming spectrum 329.

Figure 5:
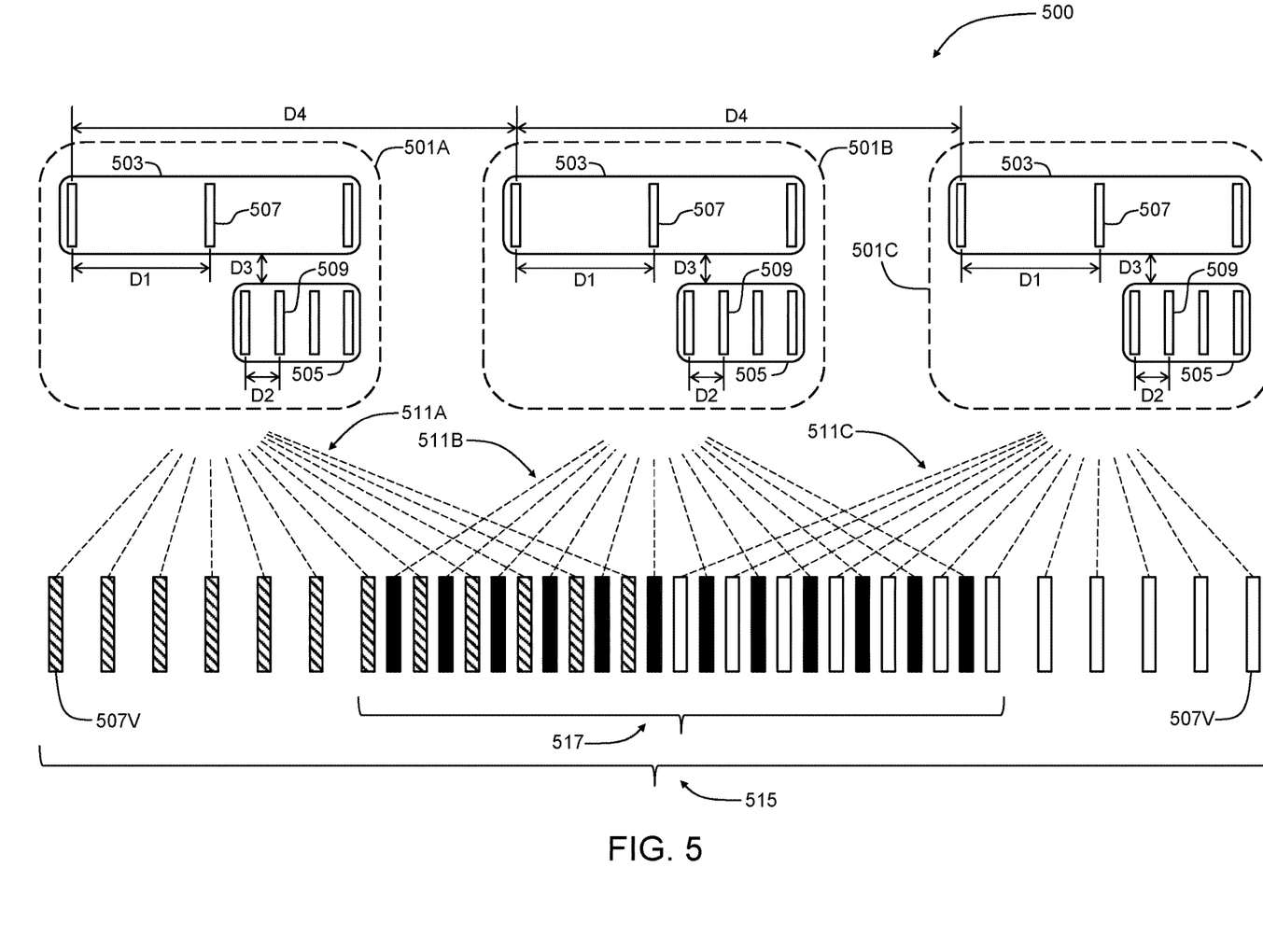
FIG. 5 illustrates an embodiment of a radar device and virtual antenna arrays, in accordance with the present disclosure.

FIG. 5 illustrates an alternate embodiment of a radar device 500 in accordance with the present disclosure. Radar device 500 includes three substantially identical transceiver sets of MIMO transmit (TX) and receive (RX) chips. In one embodiment, a first transceiver set of TX and RX chips 501A, a second transceiver set of TX and RX chips 501B, and a third transceiver chip 501C are substantially identical. Each transceiver set includes one TX chip 503 and one RX chip 505. The TX chips 503 include a TX radar front end and feedlines (not detailed) and a TX sub-array of antennas 507. The TX sub-array of antennas 507 includes a plurality (N) of such antennas 507. The RX chips 505 include a RX radar front end and feedlines (not detailed) and a RX sub-array of antennas 509. The RX sub-array of antennas 509 includes a plurality (M) of such antennas 509. In the present example N=3 and M=4. The various chip fabrications, packaging and integrations described with reference to FIG. 3 are equally applicable with respect to the embodiment shown in FIG. 5. Thus, it is envisioned that the TX and RX chips 503, 505 may be discrete components that are co-packaged into an integrated radar device, may be fabricated as part of a complete or partial system-on-chip radar device, or may be incorporated at various other levels of integration as may be required for differing end use applications.

As described, the first transceiver set of TX and RX chips 501A, the second transceiver set of TX and RX chips 501B, and the third transceiver chip 501C are substantially identical. Thus, all TX chips 503 have substantially identical spatial layouts and all RX chips 505 have substantially identical spatial layouts. In the embodiment illustrated in FIG. 5, the TX sub-array antennas 507 are spaced by a distance D1 (TX antenna spacing). The RX sub-array antennas 509 are spaced by a distance D2 (RX antenna spacing). The TX chip 503 and the RX chip 505 are separated by a TX chip to RX chip distance D3. The first transceiver set of TX and RX chips 501A and the second transceiver set of TX and RX chips 501B are offset or spaced by a distance D4 (transceiver set spacing), and the second transceiver set of TX and RX chips 501B and the third transceiver set of TX and RX chips 501C are also spaced by the same transceiver set spacing distance D4. The RX antenna spacing distance D2 may be established to a value greater than $K*\lambda$, where $\lambda$ is the radar operating wavelength. Radar operating wavelength may include one or both of a transmit wavelength and a receive wavelength. In one embodiment, K is at least 1. In another embodiment, K is an integer. In another embodiment, K is an integer greater than 1. Antenna spacing at or above the RX antenna spacing distance D2 are for the purposes of this disclosure referred to as widely spaced, whereas antenna spacing below the RX antenna spacing distance D2 are for the purposes of this disclosure referred to as narrowly spaced. The TX antenna spacing distance D1 may be established equal to M*D2 where M is the number of RX sub-array antennas 509 on each RX chip 505. The transceiver set spacing distance D4 may be established to less than N*D1 where N is the number of TX sub-array antennas 507 on each TX chip 503. The TX chip to RX chip distance D3 may be established arbitrarily though is substantially identical among the first transceiver set of TX and RX chips 501A, the second transceiver set of TX and RX chips 501B, and the third transceiver set of TX and RX chips 501C. By establishing the TX antenna spacing distance D1 and the RX antenna spacing distance D2 as described, each transceiver set of TX and RX chips establishes a respective N*M virtual array of antennas substantially uniformly spaced by the RX antenna spacing distance D2. By establishing the transceiver set spacing distance D4 as described, each respective virtual array is offset from the other and overlaps the other by some amount, whereby antennas from the respective virtual arrays alternate within the overlapped region. Thus, while the virtual arrays overlap, the individual array antennas do not overlap but are in spaced adjacency. Preferably, the separation between the adjacent, alternating antennas is substantially uniform and substantially one-half the RX antenna spacing distance D2. In combination, the respective virtual arrays established by the first transceiver set of TX and RX chips 501A, the second transceiver set of TX and RX chips 501B, and the third transceiver set of TX and RX chips 501C together establish a combined virtual array that spans a wider aperture than the individual respective virtual arrays from each of the transceiver sets of TX and RX chips thus providing higher angular resolution. Significantly, by establishing the transceiver set spacing distance D4 less than N*D1 such that the overlapped antennas alternate with tighter spacing than the RX antenna spacing distance D2 the overlapped region may provide less angular ambiguity.

As illustrated in FIG. 5, the first transceiver set of TX and RX chips 501A establishes a respective first N*M virtual array of antennas 511A (cross-hatch filled virtual antennas 507V) substantially uniformly spaced by the RX antenna spacing distance D2. In the present exemplary embodiment where N=3 and M=4 the virtual array 511A has 12 virtual antennas 507V. Similarly, the second transceiver set of TX and RX chips 501B establishes a respective second N*M virtual array of antennas 511B (solid filled virtual antennas 507V) substantially uniformly spaced by the RX antenna spacing distance D2. In the present exemplary embodiment where N=3 and M=4 the virtual array 511B also has 12 virtual antennas 507V. And, the third transceiver set of TX and RX chips 501C establishes a respective second N*M virtual array of antennas 511C (null filled virtual antennas 507V) substantially uniformly spaced by the RX antenna spacing distance D2. In the present exemplary embodiment where N=3 and M=4 the virtual array 511B also has 12 virtual antennas 507V. A combined virtual array 515 is a universal set of all virtual arrays 511A, 511B and 511C. The combined virtual array 515 includes the first virtual array 511A, the second virtual array 511B, and the third virtual array 511C, and extends to extreme regions of the respective first and third virtual arrays 511A and 511C. The first virtual array 511A and the second virtual array 511B overlap in overlap region 517 where the virtual antennas from the respective virtual arrays alternate. Similarly, the second virtual array 511B and the third virtual array 511C overlap in overlap region 517 where the virtual antennas from the respective virtual arrays alternate.

In one embodiment, radar backend processing may selectively partition the combined virtual array 515 into a first virtual sub-array including all virtual antennas 507V from the first virtual array 511A and all virtual antennas 507V from the third virtual array 511C thus extending to the extreme outer regions of the combined virtual array 515. A first beam forming operation may be performed using this first virtual sub-array to evaluate the angle of arrival of reflected radar signals as described with respect to FIG. 4. The first beam forming operation performed using this first virtual sub-array results in high angular resolution as is characteristic of the widely spaced virtual antennas. A second beam forming operation may be performed using a second virtual sub-array including all virtual antennas 507V from the second virtual array 511B and those virtual antennas 507V from the first and third virtual arrays 511A and 511C that overlap the virtual antennas 507V from the second virtual array 511B. The second beam forming operation performed using this second virtual sub-array results in lower angular resolution but less angular ambiguity as is characteristic of the narrowly spaced virtual antennas. The beam forming operations applied to the reflected radar signals from each of the first and second virtual sub-arrays may be any suitable variety as described with respect to FIG. 4. Overall, the first and second virtual sub-arrays may be processed as described with respect to FIG. 4 to match lobes between respective beam forming spectrums to determine the true angle of arrival or target angle.

Although it may be an objective for the transceiver sets to be equivalent and certain features to be uniform, certain tolerances affecting such objective may be difficult to achieve in practice. Whereas identical numbers of TX and RX chips across all transceiver sets and identical numbers of TX antennas and RX antennas within respective TX and RX chips are readily attainable, one skilled in the art understands that absolute spatial identity or symmetry is approximate and may vary with design, manufacturing, fabrication, assembly processes and levels of integration. As such, variations in the TX antenna spacings, the RX antenna spacing, the TX chip to RX chip spacing, and the transceiver spacing considered within the tolerable range of those skilled in the art are understood to be inherent and within the meaning of the phrases "substantially identical", "substantially uniform" and "substantially uniformly" as used herein.

Embodiments herein may be a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments herein are described herein with reference to process flow illustrations and/or block diagrams of methods, apparatus (systems), and computer program products according to embodiments herein. It will be understood that each block of process flow illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The process flow and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure is not limited to the particular embodiments disclosed but will include all embodiments falling within the scope thereof.

What is claimed is:

1. A radar system, comprising:
a plurality of substantially identical transceiver sets, each transceiver set comprising at least one respective transmit chip and at least one respective receive chip;
each transmit chip comprising a respective transmit front end, respective connecting traces, and a respective transmit sub-array of N substantially uniformly spaced transmit antennas where N is an integer;
each receive chip comprising a respective receive front end, respective connecting traces, and a respective receive sub-array of M substantially uniformly spaced receive antennas where M is an integer;
the substantially uniformly spaced receive antennas of each respective receive sub-array being spaced a distance D2 and the substantially uniformly spaced transmit antennas of each respective transmit sub-array being spaced a distance D1=M*D2; and
each transceiver set being spaced from adjacent transceiver sets by a substantially identical distance D4<N*D1;
wherein each transceiver set establishes a respective virtual antenna array; and
wherein the respective virtual antenna arrays established by adjacent transceiver sets at least partially overlap in an overlap region, such that the overlap region comprises alternating virtual antennas from each respective virtual antenna array separated by a distance D2/2.

2. The radar system of claim 1:
wherein the distance D2 is at least one wavelength of a radar signal.

3. The radar system of claim 2, wherein the distance D2 is an integer multiple of one wavelength of the radar signal.

4. The radar system of claim 1 wherein the at least one respective transmit chip and the at least one respective receive chip of each substantially identical transceiver set comprise separate dies packaged into separate chips.

5. The radar system of claim 1 wherein the at least one respective transmit chip and the at least one respective receive chip of each substantially identical transceiver set comprise separate dies packaged into a single chip.

6. The radar system of claim 1 wherein the at least one respective transmit chip and the at least one respective receive chip of each substantially identical transceiver set comprise a common die.

7. The radar system of claim 1, wherein the plurality of substantially identical transceiver sets comprises a common die.

8. A radar method, comprising:
establishing, with a first transceiver set, a first virtual antenna array comprising a first plurality of virtual antennas wherein all respective virtual antennas of the first plurality are substantially uniformly spaced by a distance D2;
establishing, with a second transceiver set substantially identical to the first transceiver set, a second virtual antenna array comprising a second plurality of virtual antennas wherein all respective virtual antennas of the second plurality are substantially uniformly spaced by the distance D2; and
establishing a separation distance D4<N*D1 between the first transceiver set and the second transceiver set to overlap the first virtual antenna array and the second virtual antenna array such that a portion of the first plurality of virtual antennas and a portion of the second plurality of virtual antennas alternate in spaced adjacency, such that the alternating virtual antennas are separated by a distance D2/2.

9. The radar method of claim 8, further comprising:
performing a first beam forming operation upon a first virtual sub-array comprising ones of the first plurality of virtual antennas and ones of the second plurality of virtual antennas that are spaced by at least the distance D2 to evaluate a radar signal at a first angular resolution; and
performing a second beam forming operation upon a second virtual sub-array comprising ones of the first plurality of virtual antennas and ones of the second plurality of virtual antennas that are spaced by less than the distance D2 to evaluate the radar signal at a second angular resolution less than the first angular resolution.

10. The radar method of claim 9, further comprising:
determining an angle of arrival of the radar signal based upon the evaluated radar signal at the first angular resolution and at the evaluated radar signal at the second angular resolution.

11. The radar method of claim 8 wherein the distance D2 is at least one wavelength of a radar signal.

12. The radar method of claim 11, wherein the distance D2 is an integer multiple of one wavelength of the radar signal.

13. A radar system, comprising:
a first transceiver set comprising a respective transmit chip and a respective receive chip;
a second transceiver set comprising a respective transmit chip and a respective receive chip;
the respective transmit chip and the respective receive chip of each of the first transceiver set and the second transceiver set having a substantially identical spatial layout;
each transmit chip comprising a respective transmit front end, respective connecting traces, and a respective transmit sub-array of N substantially uniformly spaced transmit antennas where N is an integer, wherein each respective transmit sub-array has a substantially identical spatial layout of the N substantially uniformly spaced transmit antennas; and
each receive chip comprising a respective receive front end, respective connecting traces, and a respective receive sub-array of M substantially uniformly spaced receive antennas where M is an integer, wherein each respective receive sub-array has a substantially identical spatial layout of the M substantially uniformly spaced receive antennas;

the substantially uniformly spaced receive antennas of each respective receive sub-array being spaced a distance D2 and the substantially uniformly spaced transmit antennas of each respective transmit sub-array being spaced a distance D1=M*D2;

each transceiver set being spaced from adjacent transceiver sets by a substantially identical distance D4<N*D1;

wherein the first transceiver set establishes a first virtual antenna array and the second transceiver set establishes a second virtual antenna array; and wherein the respective virtual antenna arrays established by adjacent transceiver sets at least partially overlap in an overlap region, such that the overlap region comprises alternating virtual antennas from each respective virtual antenna array separated by a distance D2/2.

14. The radar system of claim 13:
wherein the substantially uniformly D2.

15. The radar system of claim 14, wherein the distance D2 is an integer multiple of one wavelength of the radar signal.

16. The radar system of claim 13 wherein the respective transmit chip and the respective receive chip of each substantially identical transceiver set comprise separate dies packaged into separate chips.

17. The radar system of claim 13 wherein the respective transmit chip and the respective receive chip of each substantially identical transceiver set comprise separate dies packaged into a single chip.

18. The radar system of claim 13 wherein the respective transmit chip and the respective receive chip of each substantially identical transceiver set comprise a common die.

19. The radar system of claim 1 wherein the respective virtual antenna arrays are linear arrays.

20. The radar system of claim 13 wherein the respective virtual antenna arrays are linear arrays.

* * * * *